US012688707B2

(12) United States Patent
Jin et al.

(10) Patent No.: US 12,688,707 B2
(45) Date of Patent: Jul. 21, 2026

(54) VEHICLE POSITIONING METHOD AND DEVICE BASED ON ENVIRONMENT MATCHING, VEHICLE AND STORAGE MEDIUM

(71) Applicants: ZHEJIANG GEELY HOLDING GROUP CO., LTD., Hangzhou (CN); NINGBO GEELY AUTOMOBILE RESEARCH & DEVELOPMENT CO., LTD, Ningbo (CN)

(72) Inventors: Chen Jin, Hangzhou (CN); Hongxi Lu, Hangzhou (CN); Junjie Zhou, Hangzhou (CN); Yang Heng, Hangzhou (CN); Haojie Du, Hangzhou (CN)

(73) Assignees: ZHEJIANG GEELY HOLDING GROUP CO., LTD., Hangzhou (CN); NINGBO GEELY AUTOMOBILE RESEARCH & DEVELOPMENT CO., LTD, Ningbo (CN)

( * ) Notice: Subject to any disclaimer, the term of this patent is extended or adjusted under 35 U.S.C. 154(b) by 272 days.

(21) Appl. No.: 18/429,828

(22) Filed: Feb. 1, 2024

(65) Prior Publication Data

US 2024/0169743 A1     May 23, 2024

Related U.S. Application Data

(63) Continuation of application No. PCT/CN2021/113515, filed on Aug. 19, 2021.

(51) Int. Cl.
*G06V 20/56* (2022.01)
*G01C 21/30* (2006.01)
(Continued)

(52) U.S. Cl.
CPC ........... *G06V 20/588* (2022.01); *G01C 21/30* (2013.01); *G06V 10/74* (2022.01); *G01C 21/3602* (2013.01); *G06V 20/56* (2022.01)

(58) Field of Classification Search
CPC ... G06T 7/70; G06T 7/30; G06T 2207/30256; G06V 20/588; G06V 10/74; G06V 20/56; G01C 21/30; G01C 21/3602
See application file for complete search history.

(56) References Cited

U.S. PATENT DOCUMENTS

| 2015/0142248 A1 | 5/2015 | Han et al. |
| 2016/0097644 A1 | 4/2016 | Strassenburg-Kleciak |

(Continued)

FOREIGN PATENT DOCUMENTS

| CN | 105676253 A | 6/2016 |
| CN | 107024216 A | 8/2017 |

(Continued)

OTHER PUBLICATIONS

T. Naseer, W. Burgard and C. Stachniss, "Robust Visual Localization Across Seasons," in IEEE Transactions on Robotics, vol. 34, No. 2, pp. 289-302, Apr. 2018, doi: 10.1109/TRO.2017.2788045. (Year: 2018).*

(Continued)

*Primary Examiner* — Kenny A Cese
(74) *Attorney, Agent, or Firm* — Westbridge IP LLC

(57) ABSTRACT

Disclosed are a vehicle positioning method based on environment matching, a vehicle positioning device based on environment matching, a vehicle and a storage medium. The method includes: obtaining current environment data and a current road image of a location of a vehicle to be located; searching for an environmental impact road image set matching with the current environment data; matching the current road image with an environmental impact road (Continued)

image in the environmental impact road image set respectively to obtain a target environmental impact road image matching with the current road image; and determining current location information of the vehicle to be located based on the target environmental impact road image.

9 Claims, 6 Drawing Sheets

(51) Int. Cl.
    *G01C 21/36*        (2006.01)
    *G06V 10/74*        (2022.01)

(56) References Cited

U.S. PATENT DOCUMENTS

| | | | |
|---|---|---|---|
| 2017/0015317 A1* | 1/2017 | Fasola | G06F 18/256 |
| 2020/0134864 A1* | 4/2020 | Raichelgauz | G05D 1/0238 |
| 2022/0011116 A1 | 1/2022 | Panzer et al. | |

FOREIGN PATENT DOCUMENTS

| | | |
|---|---|---|
| CN | 109446973 A | 3/2019 |
| CN | 110657812 A | 1/2020 |
| CN | 110658539 A | 1/2020 |
| CN | 111220164 A | 6/2020 |
| CN | 111351493 A | 6/2020 |
| CN | 111435538 A | 7/2020 |
| CN | 111508258 A | 8/2020 |
| CN | 112801075 A | 5/2021 |
| EP | 2574958 A1 | 4/2013 |
| JP | 2012168098 A | 9/2012 |
| JP | 2013015341 A | 1/2013 |
| JP | 2013032953 A | 2/2013 |
| JP | 2016057801 A | 4/2016 |
| JP | 2016223847 A | 12/2016 |
| JP | 2017151148 A | 8/2017 |
| KR | 20200052868 A | 5/2020 |
| WO | 2016177372 A1 | 11/2016 |

OTHER PUBLICATIONS

P. Neubert, N. Sünderhauf and P. Protzel, "Appearance change prediction for long-term navigation across seasons," 2013 European Conference on Mobile Robots, Barcelona, Spain, 2013, pp. 198-203, doi: 10.1109/ECMR.2013.6698842. (Year: 2013).*

H. Porav, W. Maddern and P. Newman, "Adversarial Training for Adverse Conditions: Robust Metric Localisation Using Appearance Transfer," 2018 IEEE International Conference on Robotics and Automation (ICRA), Brisbane, QLD, Australia, 2018, pp. 1011-1018 , doi: 10.1109/ICRA.2018.8462894. (Year: 2018).*

Notice of Reasons for Refusal issued in counterpart Japanese Patent Application No. JP 2024-506274, dated Dec. 17, 2024.

International Search Report and Written Opinion issued in corresponding PCT Application No. PCT/CN2021/113515, dated Dec. 27, 2021.

Decision to Grant a Patent issued in counterpart Japanese Patent Application No. JP 2024-506274, dated Apr. 30, 2025.

Extended European Search Report issued in counterpart European Patent Application No. 21953755.2, dated May 16, 2025.

First Office Action issued in counterpart Chinese Patent Application No. 202180097566.9, dated May 29, 2025.

Notification to Grant Patent Right for Invention issued in counterpart Chinese Patent Application No. 202180097566.9, dated Sep. 26, 2025.

* cited by examiner

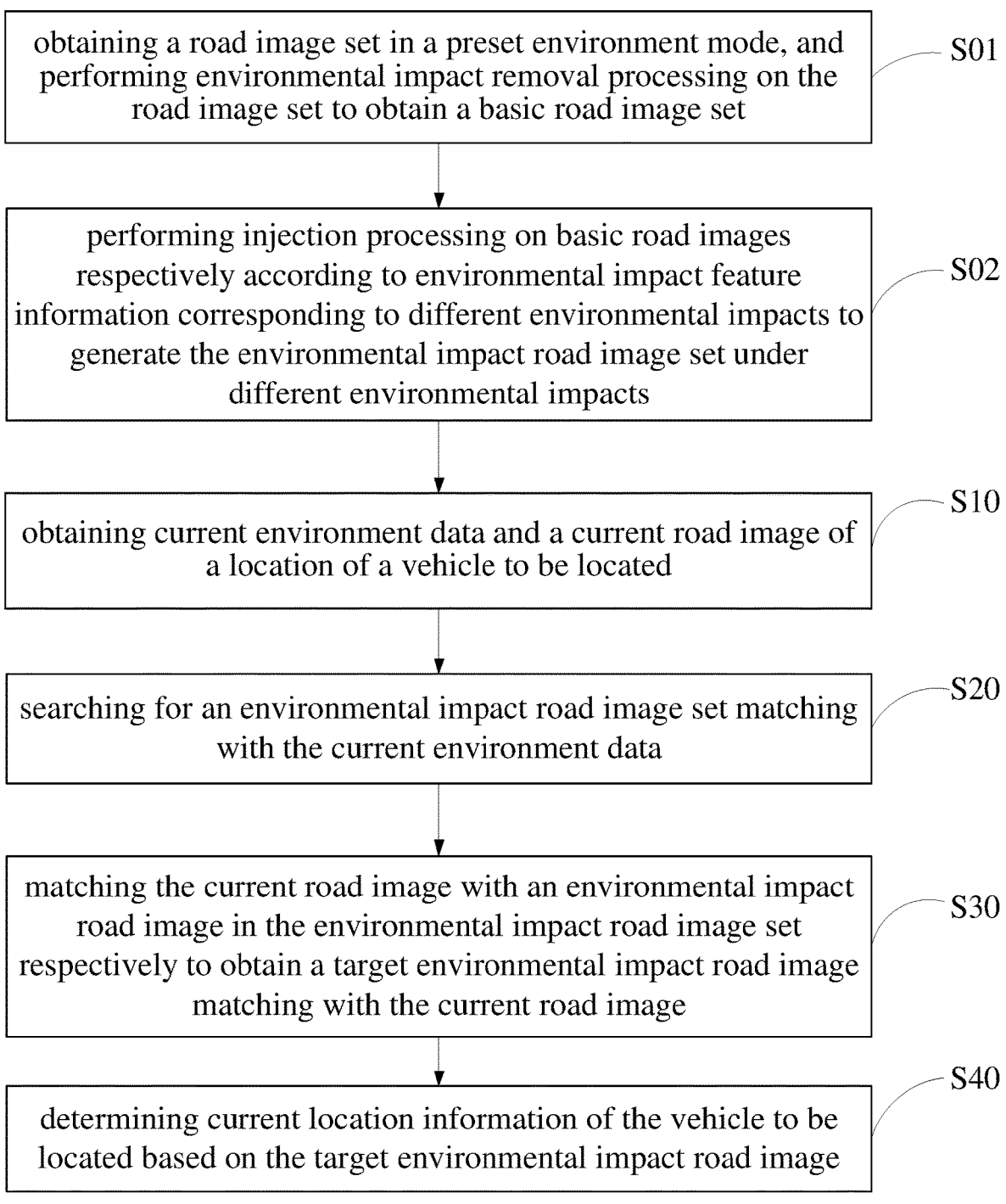

| obtaining a road image set in a preset environment mode, and performing environmental impact removal processing on the road image set to obtain a basic road image set | S01 | performing injection processing on basic road images respectively according to environmental impact feature information corresponding to different environmental impacts to generate the environmental impact road image set under different environmental impacts — S02 obtaining current environment data and a current road image of a location of a vehicle to be located — S10 searching for an environmental impact road image set matching with the current environment data — S20 matching the current road image with an environmental impact road image in the environmental impact road image set respectively to obtain a target environmental impact road image matching with the current road image — S30 determining current location information of the vehicle to be located based on the target environmental impact road image — S40

FIG. 3

VEHICLE POSITIONING METHOD AND DEVICE BASED ON ENVIRONMENT MATCHING, VEHICLE AND STORAGE MEDIUM

CROSS-REFERENCE TO RELATED APPLICATIONS

This application is a continuation of International Application No. PCT/CN2021/113515, filed on Aug. 19, 2021, the content of which is incorporated herein by reference in its entirety.

TECHNICAL FIELD

The present application relates to the field of automatic driving technology, and in particular to a vehicle positioning method based on environment matching, a vehicle positioning device based on environment matching, a vehicle and a storage medium.

BACKGROUND

With the development and iteration of autonomous driving technology, the day of achieving mass production of autonomous vehicles is getting closer and closer. During the automatic operation of the autonomous driving system, in order to better understand its own posture and perform precise behavior planning and vehicle body control, the high-precision positioning function must be mentioned. There are currently two ways to realize the high-precision positioning function recognized by the industry. One way is a high-precision positioning system based on a combination of satellite positioning and inertial navigation systems, this positioning system relies on fixed-frequency multi-satellite communication to achieve positioning, and uses inertial navigation for position estimation when satellite communication is not available in some areas such as tunnel elevated areas, so that the effect of high-precision positioning can be achieved in different directions. Another way is to carry out map collection through a single sensor such as laser and vision or through multi-sensor fusion (vision, laser, millimeter wave and so on), and use the mapping tool chain for simultaneous localization and mapping (SLAM) at the same time, and the autonomous driving system uses sensors to perform feature matching to achieve high-precision positioning when running on the road.

In specific implementation, the production of map for highly automated driving (HAD Map) requires map collection. Currently, the following two methods are commonly used for map data collection at home and abroad: 1. the map collection fleet is dedicated to collecting or updating map information, 2. collecting or updating maps in the form of data crowdsourcing. No matter which method it is based on, the current mapping method is to establish a high-precision map firstly, and then use real-time environmental awareness and high-precision maps for matching positioning when autonomous driving requires high-precision map positioning. However, there exists an information gap in this method, because high-precision maps are built based on collected map information, but the environments perceived when performing real-time positioning is quite different, such as the impact caused by different weather and different time periods such as sunny days, cloudy days, daytime, night, rainy days, snowy days, foggy days and so on.

Therefore, how to improve vehicle positioning accuracy under different environmental conditions has become an urgent problem to be solved.

The above content is only used to assist in understanding the technical solution of the present application, and does not represent an admission that the above content is prior art.

SUMMARY

The main purpose of the present application is to provide a vehicle positioning method based on environment matching, a vehicle positioning device based on environment matching, a vehicle and a storage medium, aiming to solve the technical problem of how to improve vehicle positioning accuracy under different environmental conditions.

To achieve the above objectives, the present application provides a vehicle positioning method based on environment matching, the method includes the following steps:

obtaining current environment data and a current road image of a location of a vehicle to be located;

searching for an environmental impact road image set matching with the current environment data;

matching the current road image with an environmental impact road image in the environmental impact road image set respectively to obtain a target environmental impact road image matching with the current road image; and determining current location information of the vehicle to be located based on the target environmental impact road image.

In an embodiment, before the searching for the environmental impact road image set matching with the current environment data, the method further includes:

obtaining a road image set in a preset environment mode, and performing environmental impact removal processing on the road image set to obtain a basic road image set; and performing injection processing on basic road images respectively according to environmental impact feature information corresponding to different environmental impacts to generate the environmental impact road image set under different environmental impacts.

In an embodiment, the obtaining the road image set in the preset environment mode, and performing environmental impact removal processing on the road image set to obtain the basic road image set includes:

obtaining the road image sets under different weather and different time periods respectively, and performing image recognition and feature marking on the road image set to obtain road feature marks; and performing environmental impact removal processing on the road image set according to the road feature marks to obtain the basic road image set.

In an embodiment, the performing injection processing on basic road images respectively according to environmental impact feature information corresponding to different environmental impacts to generate the environmental impact road image set under different environmental impacts includes:

obtaining weather impact factors and time period impact factors in environmental feature information corresponding to different environmental impacts;

combining the weather impact factors and the time period impact factors according to preset combination rules to obtain different environmental composite factors; and injecting the environmental composite factors into the basic road images respectively to generate the environmental impact road image set under different environmental impacts.

In an embodiment, the injecting the environmental composite factors into the basic road images respectively to generate the environmental impact road image set under different environmental impact includes:

obtaining a road component element in the basic road image set; and rendering the road component element in the basic road image set respectively according to the environmental composite factors to generate the environmental impact road image set under different environmental impacts.

In an embodiment, the searching for the environmental impact road image set matching with the current environment data includes:

obtaining historical GPS positioning information of the vehicle to be located, and determining a corresponding regional image set based on the historical GPS positioning information; and searching for the environmental impact road image set matching with current environmental data in the regional image set.

In an embodiment, the determining the current location information of the vehicle to be located based on the target environmental impact road image includes:

determining the current location information of the vehicle to be located according to the historical GPS positioning information and location information corresponding to the target environmental impact road image.

In addition, in order to achieve the above object, the present application also proposes a vehicle positioning device based on environment matching, the vehicle positioning device based on environment matching includes:

a data acquisition module configured to obtain current environment data and a current road image of a location of a vehicle to be located;

an image set search module configured to search for an environmental impact road image set matching with the current environment data;

an image matching module configured to match the current road image with an environmental impact road image in the environmental impact road image set respectively to obtain a target environmental impact road image matching with the current road image; and a vehicle positioning module configured to determine current location information of the vehicle to be located based on the target environmental impact road image.

In addition, in order to achieve the above object, the present application also proposes a vehicle, the vehicle includes: a memory, a processor and a vehicle positioning program based on environment matching that is stored in the memory and executable on the processor, and the vehicle positioning program based on environment matching is configured to implement the steps of the vehicle positioning method based on environment matching as described above.

In addition, in order to achieve the above object, the present application also proposes a storage medium, a vehicle positioning program based on environment matching is stored on the storage medium, and the steps of the vehicle positioning method based on environment matching as described above are implemented when the vehicle positioning program based on environment matching is executed by a processor.

In the present application, obtaining current environment data and a current road image of a location of a vehicle to be located; searching for an environmental impact road image set matching with the current environment data; matching the current road image with an environmental impact road image in the environmental impact road image set respectively to obtain a target environmental impact road image matching with the current road image; and determining current location information of the vehicle to be located based on the target environmental impact road image. Compared with the existing technology which mostly uses high-precision maps produced under sunny day conditions for carrying out vehicle positioning, ignoring positioning errors caused by weather and time periods, the present application by searching for the environmental impact road image set corresponding to the current environmental data of the location of the vehicle to be located, and matching the current road image of the location of the vehicle to be located with the environmental impact road image in the environmental impact road image set respectively to obtain a target environmental impact road image matching with the current road image, and then determining current location information of the vehicle to be located based on the target environmental impact road image to fully consider the mapping effects caused by different environmental factors, thereby reducing positioning errors caused by environmental interference and improving vehicle positioning accuracy under different environmental conditions.

BRIEF DESCRIPTION OF THE DRAWINGS

FIG. 3 is a schematic flow chart of a vehicle positioning method based on environment matching according to a second embodiment of the present application.

The realization of the purpose, functional features and advantages of the present application will be further described with reference to the embodiments and the accompanying drawings.

DETAILED DESCRIPTION OF THE EMBODIMENTS

It should be understood that the specific embodiments described here are only configured to explain the present application and are not intended to limit the present application.

Figure 1:
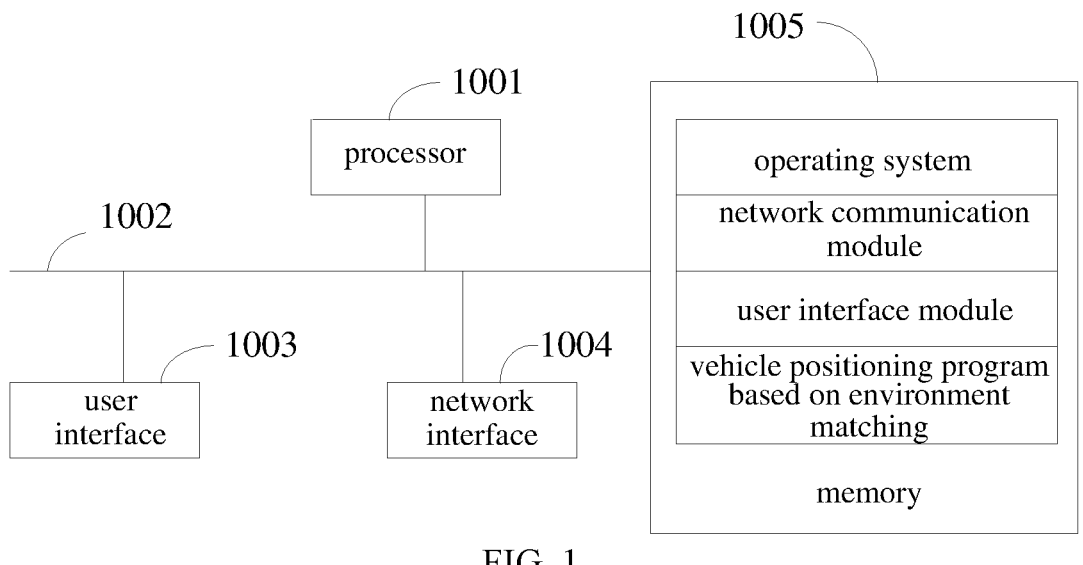
FIG. 1 is a structural schematic view of a vehicle of a hardware operating environment involved in an embodiment according to the present application.

Referring to FIG. 1, FIG. 1 is a structural schematic view of a vehicle of a hardware operating environment involved in an embodiment according to the present application.

As shown in FIG. 1, the vehicle may include: a processor 1001, such as a central processing unit (CPU), a communication bus 1002, a user interface 1003, a network interface 1004 and a memory 1005, the communication bus 1002 is configured to realize connection communication between these components. The user interface 1003 may include a display screen (Display) and an input unit such as a keyboard, the optional user interface 1003 may also include a standard wired interface and a wireless interface. The network interface 1004 may optionally include a standard wired interface or a wireless interface (such as a WIreless-FIdelity (WI-FI) interface). The memory 1005 may be a high-speed random access memory (RAM) or a stable non-volatile memory (NVM), such as a disk memory. The memory 1005 may optionally be a storage device independent of the aforementioned processor 1001.

Those skilled in the art can understand that the structure shown in FIG. 1 does not constitute a limitation to the vehicle, and may include more or fewer components than shown, or combine certain components, or arrange different components.

As shown in FIG. 1, the memory 1005 as a storage medium may include an operating system, a data storage module, a network communication module, a user interface module and a vehicle positioning program based on environment matching.

In the vehicle shown in FIG. 1, the network interface 1004 is mainly used for data communication with the network server; the user interface 1003 is mainly used for data interaction with the user; the processor 1001 and the memory 1005 in the vehicle of the present application can be provided in the vehicle, the vehicle calls the vehicle positioning program based on environment matching stored in the memory 1005 through the processor 1001 and executes the vehicle positioning method based on environment matching provided by the embodiment of the present application.

Figure 2:
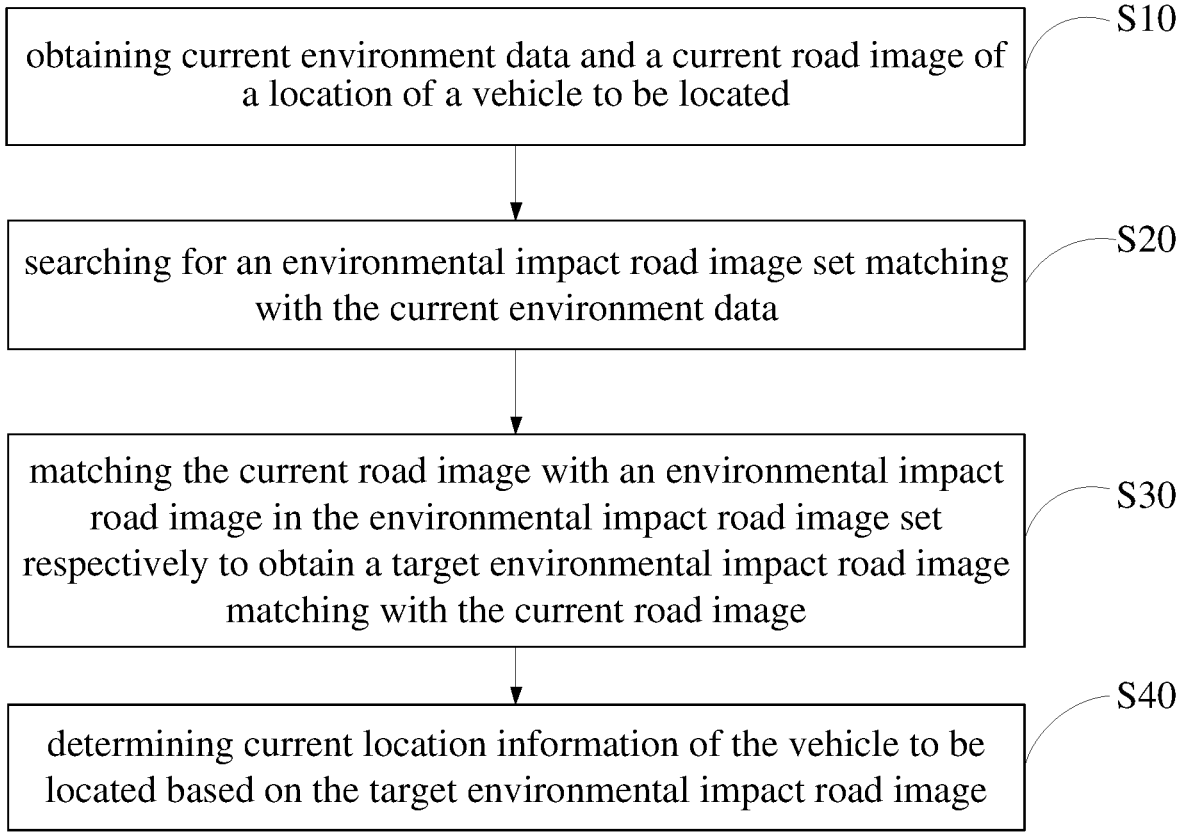
FIG. 2 is a schematic flow chart of a vehicle positioning method based on environment matching according to a first embodiment of the present application.

An embodiment according to the present application provides a vehicle positioning method based on environment matching, referring to FIG. 2, FIG. 2 is a schematic flow chart of the vehicle positioning method based on environment matching according to the first embodiment of the present application.

In this embodiment, the vehicle positioning method based on environment matching includes the following steps.

Step S10: obtaining current environment data and a current road image of a location of a vehicle to be located.

It is easy to understand that the execution subject of this embodiment can be the above-mentioned processor 1001. In a specific implementation, the current road image of the location of the vehicle to be located can be collected through a single sensor such as laser and vision or multi-sensor fusion (vision, laser, millimeter wave, or the like) connected to the processor 1001, the current road image can be understood as an image corresponding to the road where the vehicle to be located is currently located. In a specific implementation, since there also exists unplanned roads, it can also be an image corresponding to the area where the vehicle to be located is currently located, the size of the area can be set according to actual needs, and the embodiment does not limit this.

In a specific implementation, in order to improve the accuracy of data collection and further improve the accuracy of vehicle positioning, the current environmental data of the location of the vehicle to be positioned can also be obtained. The current environmental data includes current weather data and current time period data, the current weather data can be configured to reflect the current weather conditions of the location of the vehicle to be located, such as sunny, cloudy, rainy, snowy, foggy and so on; the current time period of the location of the vehicle to be located is reflected through the current time period data, such as early morning, noon, evening, late night and so on.

Step S20: searching for an environmental impact road image set matching with the current environment data.

It should be noted that after obtaining the current environment data, an environmental impact road image set matching the current environmental data can be searched in the preset road image database, the environment-impact road image set can be understood as a data set containing corresponding road images under different environmental impacts, for example, the road image corresponding to the late night on a rainy day, the road image corresponding to the early morning on a foggy day, the road image corresponding to the cloudy evening and so on. The preset road image database can be understood as a database that is updated in real time and stores image sets corresponding to different roads (or different areas) under different environmental impacts.

Step S30: matching the current road image with an environmental impact road image in the environmental impact road image set respectively to obtain a target environmental impact road image matching with the current road image.

Step S40: determining current location information of the vehicle to be located based on the target environmental impact road image.

It is easy to understand that when obtaining an environmental impact road image set matching with the current environmental data of the location of the vehicle to be located, the current road image of the location of the vehicle to be located can be respectively matched with the environmental impact road images in the environmental impact road image set, obtain a target environmental impact road image matching with the current road image, and determine the current location information of the vehicle to be located based on the target environmental impact road image. In a specific implementation, a corresponding high-precision map can be drawn through simultaneous positioning and mapping technology according to the environmental impact road image set, and then perform the vehicle positioning based on the obtained high-precision map. Furthermore, the position information corresponding to the target environmental impact road image in the high-precision map can be used as the current position information of the vehicle to be located, such as the position coordinates corresponding to the target environmental impact road image are (a, b, c), then (a, b, c) is used as the current position information of the vehicle to be located.

In this embodiment, obtaining current environment data and a current road image of a location of a vehicle to be located; searching for an environmental impact road image set matching with the current environment data; matching the current road image with an environmental impact road image in the environmental impact road image set respectively to obtain a target environmental impact road image matching with the current road image; and determining current location information of the vehicle to be located based on the target environmental impact road image. Compared with the existing technology which mostly uses high-precision maps produced under sunny day conditions for carrying out vehicle positioning, ignoring positioning errors caused by weather and time periods, in this embodiment, by searching for the environmental impact road image set corresponding to the current environmental data of the location of the vehicle to be located, and matching the current road image of the location of the vehicle to be located with the environmental impact road image in the environmental impact road image set respectively to obtain a target environmental impact road image matching with the current road image, and then determining current location information of the vehicle to be located based on the target environmental impact road image to fully consider the mapping effects caused by different environmental factors, thereby reducing positioning errors caused by environmental interference and improving vehicle positioning accuracy under different environmental conditions.

Referring to FIG. 3, FIG. 3 is a schematic flow chart of a vehicle positioning method based on environment matching according to the second embodiment of the present application.

Based on the above first embodiment, in this embodiment, before step S20, the method further includes the following steps.

Step S01: obtaining a road image set in a preset environment mode, and performing environmental impact removal processing on the road image set to obtain a basic road image set.

It should be noted that in order to obtain the environmental impact road image set under different environmental impacts, different weather (such as sunny, cloudy, rainy, snowy, foggy and so on) and different time periods (such as early morning, noon and so on) can be firstly obtained separately, and performing image recognition on the road image set to obtain image recognition results, and then performing feature marking on the image recognition results to obtain road feature marks, the feature marks can be understood as feature information in the marked image recognition results, which can be configured to identify weather, time periods, road component elements, the categories of road component elements and so on. For example, if the image recognition result of the road component elements of a certain road is streetlights on a dimly lit road, then the corresponding road feature marks are evening/late night and streetlights. For another example, if the image recognition result of the road component elements of a certain road is a warning sign covered by snow, the corresponding road feature marks are snowy day and warning sign. The road component elements can be understood as different components that make up the road, such as road traffic sign elements (such as warning signs, prohibition signs, guide signs and so on), road traffic marking elements (such as instruction markings, prohibited markings, warning markings and so on), transportation facility elements (such as traffic lights, street lights, crash guardrails and so on), building facility elements (such as residences, schools, hospitals and so on) and so on. In a specific implementation, in order to improve the accuracy of feature marks, it is also possible to receive mark correction information input by the user, and add/delete/modify the image feature marks according to the mark correction information; or directly receive road feature marks input by the user.

It is easy to understand that when obtaining the road feature mark, environmental impact removal processing can be performed on the road image set according to the road feature mark to obtain a basic road image set, the environmental impact processing can be understood as performing corresponding post-effect processing on the road image sets affected by environmental factors according to the different environmental impacts, and obtaining a basic road image set without environmental impact. In a specific implementation, corresponding effect processing plug-ins can be selected according to different environmental impacts, and then corresponding post-effect processing is performed on the road image set through different effect processing plug-ins to obtain a basic road image set. For example, if the weather mark in the road feature mark is snowy day, then call the effect processing plug-in corresponding to the snowy day. For another example, if the mark identifying the time period in the road feature mark is evening/late night, then call the effect processing plug-in corresponding to evening/late night. Furthermore, the corresponding effect processing plug-in can be called by combining the marks identifying the element categories in the feature marking to perform environmental impact removal processing. For example, if the road feature marks are evening/late night and street lights, then call the effect processing plug-in corresponding to evening/late night and street lights, or the effect plug-in corresponding to evening/late night and the element category to which street lights belong (that is transportation facility elements). For another example, if the road feature marks are snowy days and warning signs, then call the effect processing plug-in corresponding to the snowy days and warning signs, or the effect plug-in corresponding to the snowy weather and the element category to which warning signs belong (that is road traffic sign elements).

In a specific implementation, the corresponding basic high-precision map can also be drawn through simultaneous positioning and mapping technology according to the basic road image set, and then the vehicle can be initially positioned based on the obtained basic high-precision map. Furthermore, it can also draw the corresponding high-precision map through simultaneous positioning and mapping technology combining with the subsequent environmental impact road image set, and then perform dual positioning based on the obtained basic high-precision map and high-precision map to further improve vehicle positioning accuracy and user's riding safety.

Step S02: performing injection processing on basic road images respectively according to environmental impact feature information corresponding to different environmental impacts to generate the environmental impact road image set under different environmental impacts.

It should be noted that in order to improve the image accuracy of the obtained environmental impact road image set under different environmental impacts, the weather impact factors and time period impact factors in environmental feature information corresponding to different environmental impacts can be obtained, the weather impact factors can be understood as corresponding image impact factors under different weather, such as rain, wind, snow, fog, sand and dust and so on, the time period impact factors can be understood as corresponding image impact factors in different time periods, such as temperature and humidity, light brightness and so on, and then, combining the weather impact factors and the time period impact factors according to preset combination rules to obtain different environmental composite factors, the preset combination rules can be set according to actual needs, for example, combining each weather impact factor and each time period impact factor respectively, which is not limited in this embodiment, and then injecting the environmental composite factors into the basic road images respectively to generate the environmental impact road image set under different environmental impact. In a specific implementation, the corresponding effect processing plug-in can be matched according to the environmental composite factor, and the environmental composite factors are respectively injected into the basic road image through the effect processing plug-in to generate the environmental impact road image set under different environmental impact. For example, if the environmental composite factor is a combination of snow and low light brightness, then the matching effect processing plug-in can be the effect processing plug-in corresponding to snowy days and evening/late night.

It is easy to understand that in order to improve the image accuracy of the obtained environmental impact road image set under different environmental impact, it also can obtain a road component element in the basic road image set, and render the road component element in the basic road image set respectively according to the environmental composite factors to generate the environmental impact road image set under different environmental impact. In a specific implementation, it can match the corresponding effect processing plug-in according to the environmental composite factor, and render the road component elements in the basic road image set respectively through the effect processing plug-in respectively to generate the environmental impact road image set under different environmental impact. Furthermore, in order to improve the accuracy of the obtained environmental impact road image set under different environmental impact, it can also be combined with road component elements to match corresponding effect processing plug-ins. For example, if the environmental composite factor is a combination of snow and low light intensity, and the road component element is an anti-collision guardrail, then call the effect processing plug-in corresponding to snow, evening/late night and anti-collision guardrail, and render the anti-collision guardrail through the effect processing plug-in; or call the effect plug-in corresponding to the snowy day, evening/late night and the element category to which the anti-collision guardrail belongs (that is the transportation facility element), and render the anti-collision guardrail through the effect processing plug-in. In this way, the road component elements in the basic road image set are traversed to obtain the environmental impact road image set under different environmental impact. Furthermore, the corresponding high-precision map can be drawn through simultaneous positioning and mapping technology according to the environmental impact road image set, and then perform vehicle positioning based on the obtained high-precision map.

Figure 4:
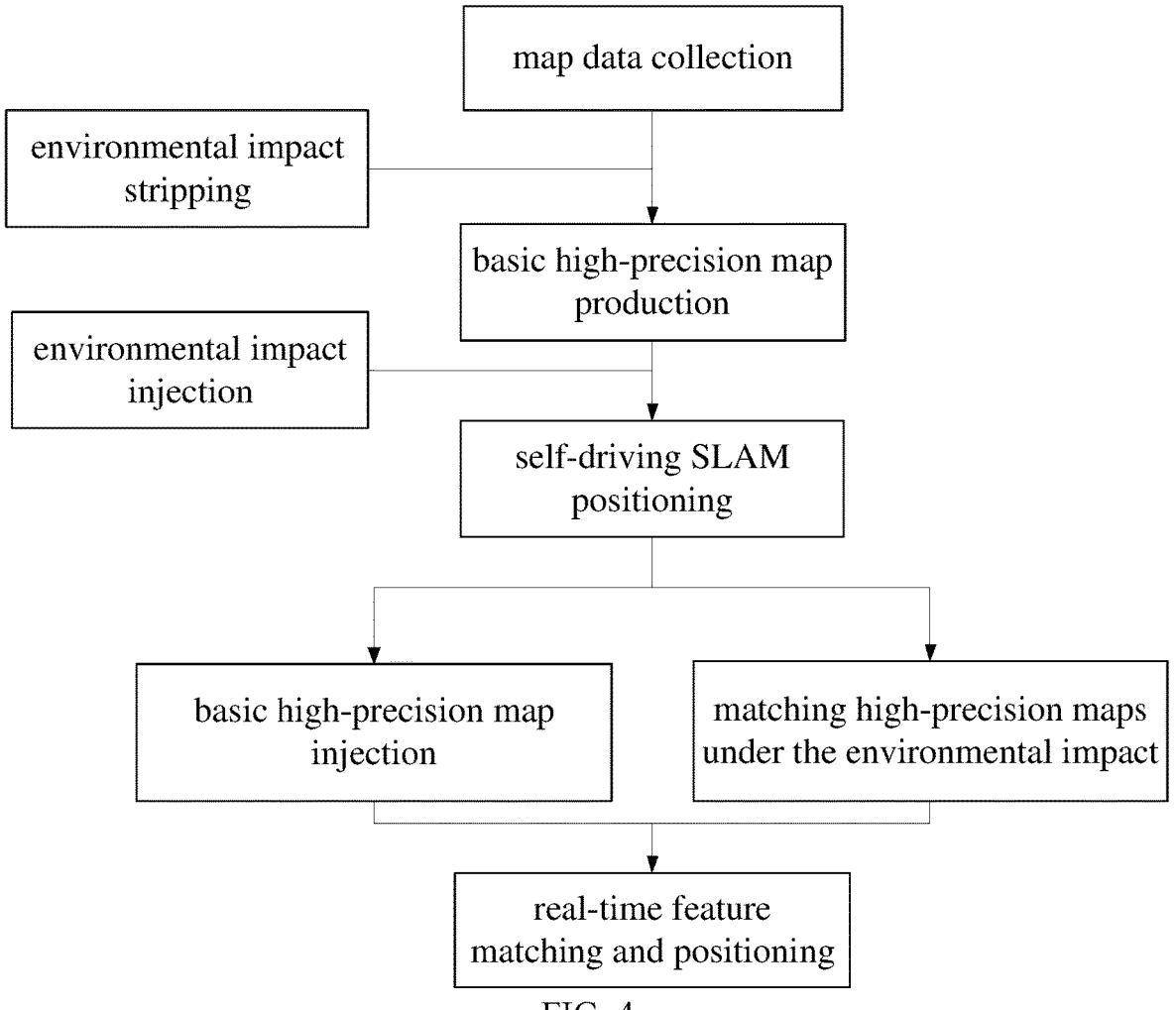
FIG. 4 is a schematic view of dual positioning involved in a second embodiment of a vehicle positioning method based on environment matching according to the present application.

Referring to FIG. 4, FIG. 4 is a schematic view of dual positioning involved in the second embodiment of a vehicle positioning method based on environment matching according to the present application.

In FIG. 4, after collecting the map data (that is the road image set in the above-mentioned preset environment mode), environmental impact stripping (that is the above-mentioned environmental impact removal processing) can be performed on the map data to obtain the basic road image set, and then the corresponding basic high-precision map is drawn through simultaneous positioning and mapping technology based on the basic road image set, then, environmental impact injection is performed on the basic high-precision map (that is, the above-mentioned injection processing is performed on the basic road images respectively according to the environmental impact feature information corresponding to different environmental impacts) to generate the environmental impact road image set under different environmental impacts, and drawing the corresponding high-precision map through simultaneous positioning and mapping technology based on the environmental impact road image set, and then performing real-time dual positioning by combining the matched high-precision map under the impact of the current environment and the basic high-precision map to further improve vehicle positioning accuracy and user's riding safety.

In this embodiment, obtaining a road image set in a preset environment mode, and performing environmental impact removal processing on the road image set to obtain a basic road image set; and performing injection processing on basic road images respectively according to environmental impact feature information corresponding to different environmental impacts to generate the environmental impact road image set under different environmental impacts. By performing environmental impact removal processing on the road image set in the preset environment mode to obtain the basic road image set, and then performing injection processing on basic road images respectively according to environmental impact feature information corresponding to different environmental impacts, generating the environmental impact road image set under different environmental impacts, so as to improve the accuracy of the obtained environmental impact road image set under different environmental impacts and the accuracy of the subsequent high-precision map drawn based on the environmental impact road image set under different environmental impacts, furthermore, it also improves the accuracy of vehicle positioning based on the obtained high-precision map.

Figure 5:
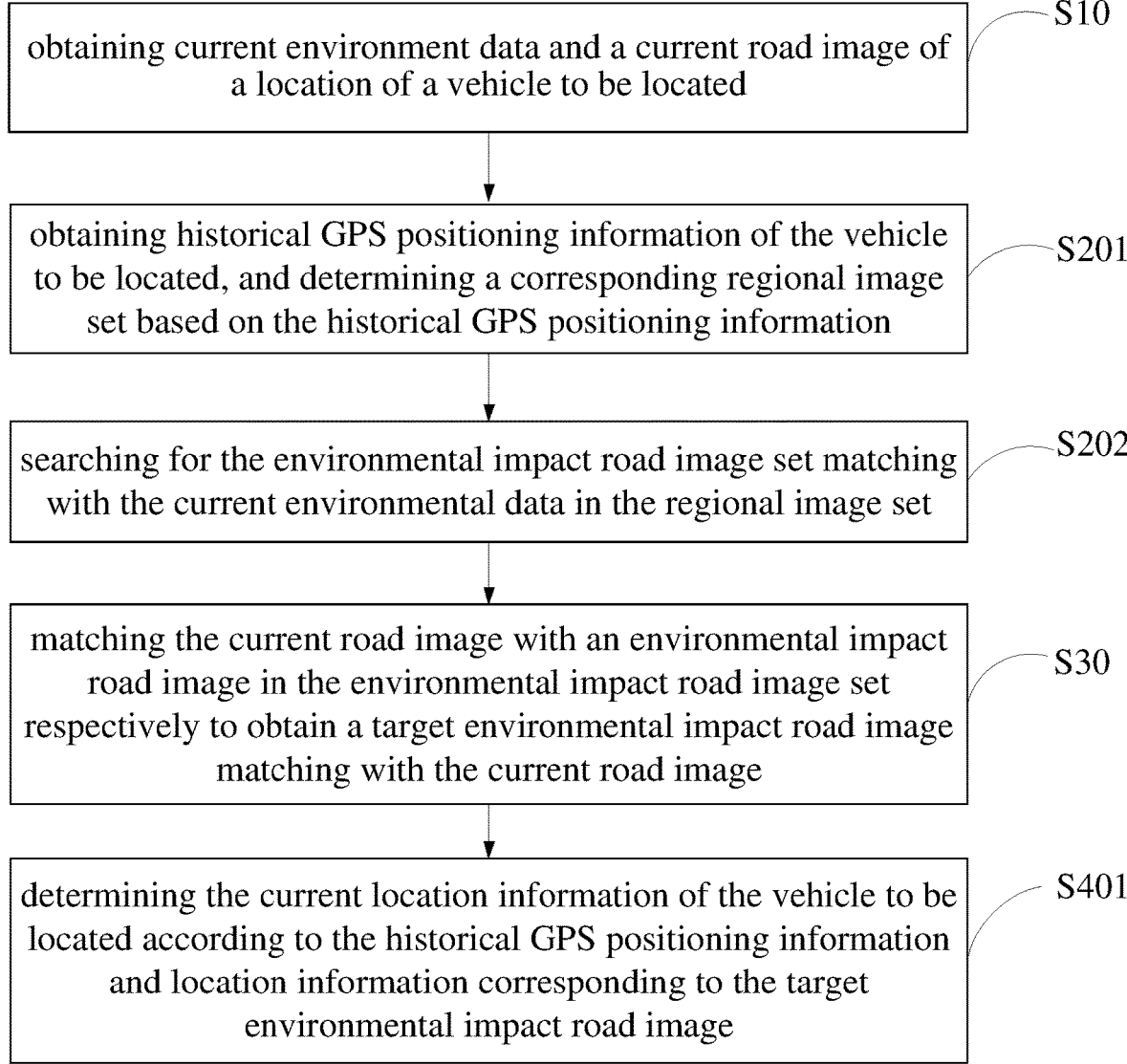
FIG. 5 is a schematic flow chart of a vehicle positioning method based on environment matching according to a third embodiment of the present application.

Referring to FIG. 5, FIG. 5 is a schematic flow chart of a vehicle positioning method based on environment matching according to the third embodiment of the present application.

Based on the above embodiments, in this embodiment, step S20 includes:

step S201: obtaining historical Global Positioning System (GPS) positioning information of the vehicle to be located, and determining a corresponding regional image set based on the historical GPS positioning information; and step S202: searching for the environmental impact road image set matching with the current environmental data in the regional image set.

It is easy to understand that in order to improve search efficiency of the image set, the historical GPS positioning information of the vehicle to be located can be obtained first, and determining the corresponding regional image set based on the historical GPS positioning information, and then searching for the environmental impact road image set matching with the current environmental data in the regional image set. It is easy to understand that while the vehicle is driving, there may be situations where it is difficult to locate the vehicle due to weak GPS signals, the historical GPS positioning information can be obtained at this time, and determine the corresponding regional image set based on the historical GPS positioning information, the regional image set can be understood as different image sets stored in the preset road image database and divided according to different regions, the preset road image database can be understood as a database that is updated in real time and stores image sets corresponding to different roads (or different areas) under different environmental impacts. In specific implementation, the area size can be set according to actual needs, and this embodiment does not limit this. In addition, it should be noted that what is obtained in this embodiment is not limited to the historical GPS positioning information of the vehicle to be located, but can also be inertial navigation positioning information and so on, which is not limited in this embodiment.

Correspondingly, the step S40 includes:

step S401: determining the current location information of the vehicle to be located according to the historical GPS positioning information and location information corresponding to the target environmental impact road image.

In this embodiment, in order to improve vehicle positioning accuracy, it also can predict the GPS positioning information at the current moment according to the historical GPS positioning information, and then determining the current location information of the vehicle to be located according to the predicted GPS positioning information at the current moment and location information corresponding to the target environmental impact road image. In a specific implementation, it can also be determined whether the error rate between the predicted GPS positioning information at the current moment and the position information corresponding to the target environmental impact road image in different scenarios is less than or equal to the preset error rate, when the error is less than or equal to the preset error, setting the corresponding weights of the predicted GPS positioning information at the current moment and the position information corresponding to the target environmental impact road image in different scenarios, and then determining the current location information of the vehicle to be located based on the predicted GPS positioning information at the current moment and the position information corresponding to the target environmental impact road image and their corresponding weights, the preset error rate can be set according to actual needs, which is not limited in this embodiment. In a specific implementation, the corresponding high-precision map can be drawn according to the environmental impact road image set through simultaneous positioning and mapping technology, and then obtaining the corresponding position information of the target environmental impact road image in the high-precision map, and determining the current location information of the vehicle to be positioned based on the location information corresponding to the target environmental impact road image in the high-precision map and the predicted GPS positioning information at the current moment. For example, the position coordinates corresponding to the target environmental impact road image are (a, b, c), and the corresponding weight is 0.7, The predicted GPS positioning information at the current moment is (d, e, f), and the corresponding weight is 0.3, then the current location information of the vehicle to be located can be (0.7a+0.3d, 0.7b+0.3e, 0.7c+0.3f).

In this embodiment, obtaining historical GPS positioning information of the vehicle to be located, and determining a corresponding regional image set based on the historical GPS positioning information; and searching for the environmental impact road image set matching with the current environmental data in the regional image set. The image set search efficiency is improved by determining the corresponding regional image set according to the historical GPS positioning information of the vehicle to be located, and searching for the environmental impact road image set matching the current environment data in the regional image set, so as to further improve the subsequent positioning efficiency of vehicle positioning based on image sets. In addition, in this embodiment, the current location information of the vehicle to be located is determined according to the historical GPS positioning information and location information corresponding to the target environmental impact road image. The current location information of the vehicle to be located is determined by combining the historical GPS positioning information of the vehicle to be located and location information corresponding to the target environmental impact road image, so that while minimizing vehicle positioning errors and improving vehicle positioning accuracy, it also provides double guarantees for vehicle positioning and improves users' riding safety.

In addition, embodiments of the present application also provide a storage medium, a vehicle positioning program based on environment matching is stored on the storage medium, and the steps of the vehicle positioning method based on environment matching as described above are implemented when the vehicle positioning program based on environment matching is executed by a processor.

Figure 6:
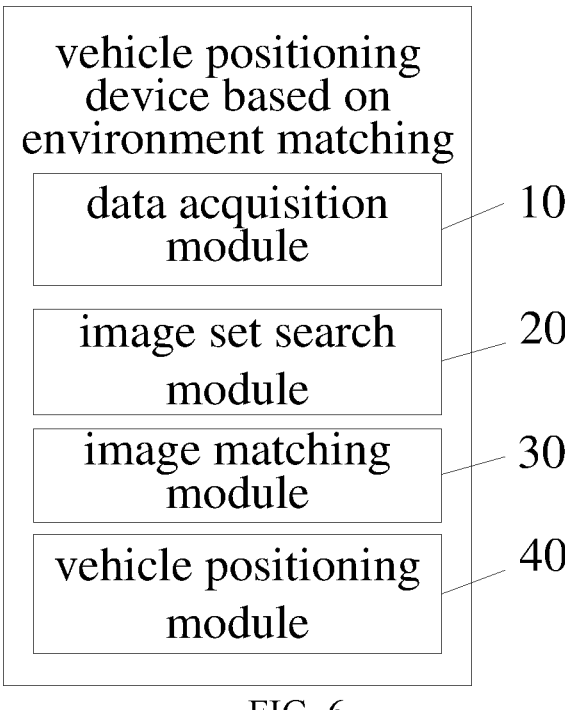
FIG. 6 is a structural block view of a vehicle positioning method based on environment matching according to a first embodiment of the present application.

Referring to FIG. 6, FIG. 6 is a structural block diagram of a vehicle positioning method based on environment matching according to the first embodiment of the present application.

As shown in FIG. 6, the vehicle positioning device based on environment matching proposed by the embodiment of the present application includes:

a data acquisition module 10 configured to obtain current environment data and a current road image of a location of a vehicle to be located;

an image set search module 20 configured to search for an environmental impact road image set matching with the current environment data;

an image matching module 30 configured to match the current road image with an environmental impact road image in the environmental impact road image set respectively to obtain a target environmental impact road image matching with the current road image; and a vehicle positioning module 40 configured to determine current location information of the vehicle to be located based on the target environmental impact road image.

In this embodiment, obtaining current environment data and a current road image of a location of a vehicle to be located, searching for an environmental impact road image set matching with the current environment data, matching the current road image with an environmental impact road image in the environmental impact road image set respectively to obtain a target environmental impact road image matching with the current road image, and determining current location information of the vehicle to be located based on the target environmental impact road image. Compared with the existing technology which mostly uses high-precision maps produced under sunny day conditions for carrying out vehicle positioning, ignoring positioning errors caused by weather and time periods, in this embodiment, by searching for the environmental impact road image set corresponding to the current environmental data of the location of the vehicle to be located, and matching the current road image of the location of the vehicle to be located with the environmental impact road image in the environmental impact road image set respectively to obtain a target environmental impact road image matching with the current road image, and then determining current location information of the vehicle to be located based on the target environmental impact road image to fully consider the mapping effects caused by different environmental factors, thereby reducing positioning errors caused by environmental interference and improving vehicle positioning accuracy under different environmental conditions.

Based on the above-mentioned first embodiment of the vehicle positioning device based on environment matching of the present application, proposing the second embodiment of the vehicle positioning device based on environment matching of the present application.

In this embodiment, the data acquisition module 10 is also configured to obtain a road image set in a preset environment mode, and perform environmental impact removal processing on the road image set to obtain a basic road image set.

The data acquisition module 10 is also configured to perform injection processing on basic road images respectively according to environmental impact feature information corresponding to different environmental impacts to generate the environmental impact road image set under different environmental impacts.

The data acquisition module 10 is also configured to obtain the road image sets under different weather and different time periods respectively, and perform image recognition and feature marking on the road image set to obtain road feature marks.

The data acquisition module 10 is also configured to perform environmental impact removal processing on the road image set according to the road feature marks to obtain the basic road image set.

The data acquisition module 10 is also configured to obtain the weather impact factors and time period impact factors in environmental feature information corresponding to different environmental impacts.

The data acquisition module 10 is also configured to combine the weather impact factors and the time period impact factors according to preset combination rules to obtain different environmental composite factors.

The data acquisition module 10 is also configured to inject the environmental composite factors into the basic road images respectively to generate the environmental impact road image set under different environmental impact.

The data acquisition module 10 is also configured to obtain a road component element in the basic road image set.

The data acquisition module 10 is also configured to render the road component element in the basic road image set respectively according to the environmental composite factors to generate the environmental impact road image set under different environmental impact.

The image set search module 20 is also configured to obtain historical GPS positioning information of the vehicle to be located, and determine a corresponding regional image set based on the historical GPS positioning information.

The image set search module 20 is also configured to search for the environmental impact road image set matching with the current environmental data in the regional image set.

The vehicle positioning module 40 is also configured to determine the current location information of the vehicle to be located according to the historical GPS positioning information and location information corresponding to the target environmental impact road image.

For other embodiments or specific implementations of the vehicle positioning device according to environment matching of the present application, reference may be made to the above method embodiments, which will not be described again here.

It should be noted that, as used herein, the terms "comprise", "include" or any other variations thereof are intended to cover a non-exclusive inclusion, such that a process, method, article or device that includes a list of elements includes not only those elements, but also other elements not expressly listed or elements inherent to such a process, method, article or device. Without further limitation, an element defined by the statement "comprises a/an . . . " does not exclude the existence of other identical elements in the process, method, article or device including this element.

The above serial numbers of the embodiments according to the present application are only for description and do not represent the advantages or disadvantages of the embodiments.

Through the above description of the embodiments, those skilled in the art can clearly understand that the methods of the above embodiments can be implemented by means of software plus the necessary general hardware platform, it can also be implemented by hardware certainly, but in many cases the former is a better implementation. Based on this understanding, the technical solution of the present application is essentially or the part that contributes to the existing technology can be embodied in the form of software products. The computer software product is stored in a storage medium (such as ROM/RAM, magnetic disk and CD), and includes several instructions to cause an terminal device (which can be a mobile phone, a computer, a server, an air conditioner, or a network device and so on) to execute the methods described in various embodiments according to the present application.

The above are only some embodiments of the present application, and are not intended to limit the scope of the present application. Any equivalent structures or equivalent process transformations made using the contents of the description and accompanying drawings of the present application, or directly or indirectly applied in other related technical fields, are all similarly included in the scope of the present application.

What is claimed is:

1. A vehicle positioning method based on environment matching, comprising:

obtaining current environment data and a current road image of a location of a vehicle to be located;

searching for an environmental impact road image set matching with the current environment data;

matching the current road image with an environmental impact road image in the environmental impact road image set respectively to obtain a target environmental impact road image matching with the current road image; and determining current location information of the vehicle to be located based on the target environmental impact road image;

wherein before the searching for the environmental impact road image set matching with the current environment data, the method further comprises:

obtaining a road image set in a preset environment mode, and performing environmental impact removal processing on the road image set to obtain a basic road image set; and performing injection processing on basic road images respectively according to environmental impact feature information corresponding to different environmental impacts to generate the environmental impact road image set under different environmental impacts.

2. The vehicle positioning method based on environment matching according to claim 1, wherein the obtaining the road image set in the preset environment mode, and performing environmental impact removal processing on the road image set to obtain the basic road image set comprises:

obtaining the road image sets under different weather and different time periods respectively, and performing image recognition and feature marking on the road image set to obtain road feature marks; and performing environmental impact removal processing on the road image set according to the road feature marks to obtain the basic road image set.

3. The vehicle positioning method based on environment matching according to claim 1, wherein the performing injection processing on basic road images respectively according to environmental impact feature information corresponding to different environmental impacts to generate the environmental impact road image set under different environmental impacts comprises:

obtaining weather impact factors and time period impact factors in environmental feature information corresponding to different environmental impacts;

combining the weather impact factors and the time period impact factors according to preset combination rules to obtain different environmental composite factors; and injecting the environmental composite factors into the basic road images respectively to generate the environmental impact road image set under different environmental impacts.

4. The vehicle positioning method based on environment matching according to claim 3, wherein the injecting the environmental composite factors into the basic road images respectively to generate the environmental impact road image set under different environmental impacts comprises:

obtaining a road component element in the basic road image set; and rendering the road component element in the basic road image set respectively according to the environmental composite factors to generate the environmental impact road image set under different environmental impacts.

5. The vehicle positioning method based on environment matching according to claim 1, wherein the searching for the environmental impact road image set matching with the current environment data comprises:

obtaining historical Global Positioning System (GPS) positioning information of the vehicle to be located, and determining a corresponding regional image set based on the historical GPS positioning information; and searching for the environmental impact road image set matching with current environmental data in the regional image set.

6. The vehicle positioning method based on environment matching according to claim 5, wherein the determining the current location information of the vehicle to be located based on the target environmental impact road image comprises:

determining the current location information of the vehicle to be located according to the historical GPS positioning information and location information corresponding to the target environmental impact road image.

7. A vehicle positioning device based on environment matching, comprising:

a data acquisition module configured to obtain current environment data and a current road image of a location of a vehicle to be located;

an image set search module configured to search for an environmental impact road image set matching with the current environment data;

an image matching module configured to match the current road image with an environmental impact road image in the environmental impact road image set respectively to obtain a target environmental impact road image matching with the current road image;

a vehicle positioning module configured to determine current location information of the vehicle to be located based on the target environmental impact road image; and wherein the data acquisition module is configured to obtain a road image set in a preset environment mode, and perform environmental impact removal processing on the road image set to obtain a basic road image set; and perform injection processing on basic road images respectively according to environmental impact feature information corresponding to different environmental impacts to generate the environmental impact road image set under different environmental impacts.

8. A vehicle, comprising: a memory, a processor and a vehicle positioning program based on environment matching that is stored in the memory and executable on the processor, and the vehicle positioning program based on environment matching is configured to implement the steps of the vehicle positioning method based on environment matching according to claim 1.

9. A non-transitory storage medium, wherein a vehicle positioning program based on environment matching is stored on the non-transitory storage medium, and the steps of the vehicle positioning method based on environment matching according to claim 1 are implemented when the vehicle positioning program based on environment matching is executed by a processor.

* * * * *